Sept. 3, 1940.  J. HOZA  2,213,913
MACHINE FOR THE MANUFACTURE OF BOOTS, SHOES,
AND LIKE ARTICLES OF FOOTWEAR
Original Filed July 5, 1938  3 Sheets-Sheet 1

Sept. 3, 1940.                J. HOZA                    2,213,913
        MACHINE FOR THE MANUFACTURE OF BOOTS, SHOES,
              AND LIKE ARTICLES OF FOOTWEAR
              Original Filed July 5, 1938      3 Sheets-Sheet 3
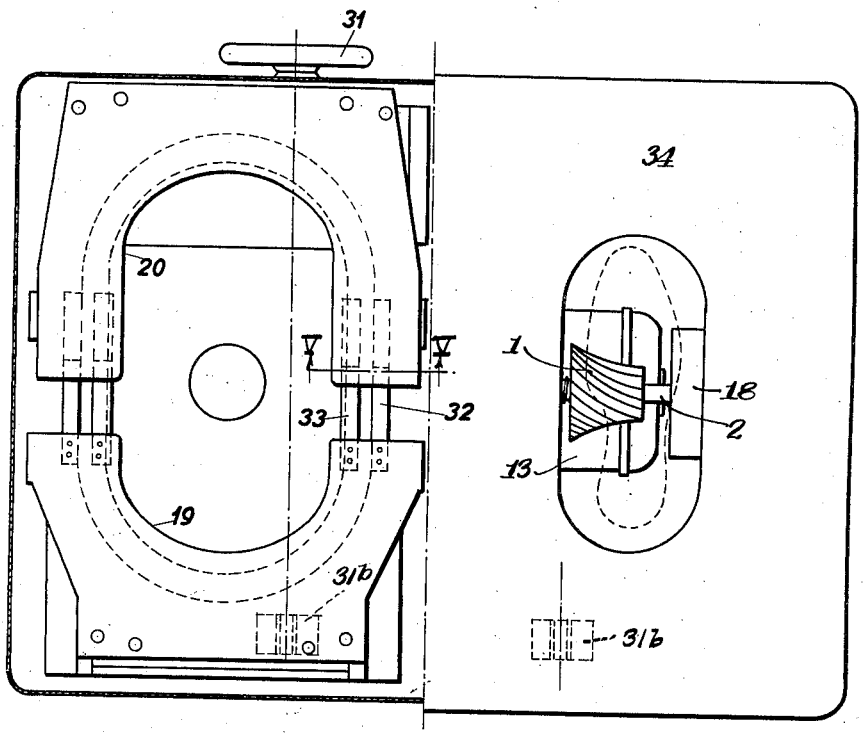
FIG. 3.
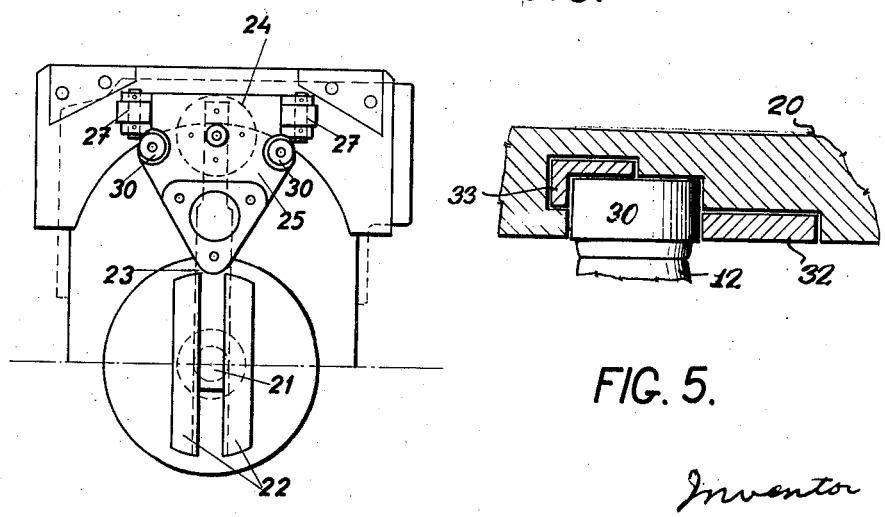
FIG. 5.
FIG. 4.
Inventor
John Hoza
By John E Eastlack
Attorney Patented Sept. 3, 1940

2,213,913

UNITED STATES PATENT OFFICE 2,213,913

MACHINE FOR THE MANUFACTURE OF BOOTS, SHOES, AND LIKE ARTICLES OF FOOTWEAR

John Hoza, Zlin, Czechoslovakia

Application July 5, 1938, Serial No. 217,533. Renewed April 10, 1940. In Czechoslovakia June 14, 1937

16 Claims. (Cl. 12—29)

This invention relates to machines for the manufacture of boots, shoes and like articles of footwear, such articles being hereinafter generally called "shoes and the like."

In the manufacture of shoes and the like, primarily through-stitched shoes having a channel into which the stitches are inserted, a rolled-in sole is employed which must be made to suit the form of the body of the last and which must be turned in after the sewing operation in order to close the channel.

The work of rolling-in the sole has formerly been done by hand or by use of a tool mounted on an extension of a motor-shaft and constituted as a hyperbolic superficially grooved roller. In use of such a tool, an operator presses the sole by hand against the rotating roller, and in this way simultaneously rolls in the sole and turns in the channel. The hand work involved by the use of such a tool has certain disadvantages, namely: comparatively great strength must be exerted in pressing the sole against the tool; it is most difficult to maintain the pressure uniform and perform satisfactorily even and good-quality work; much time is required, and so the work is undesirably slow and expensive; the vibratory nature of the operation is harmful to the health of the operators.

The chief object of this invention is to obviate these disadvantages by providing a machine capable of performing the operation concerned automatically, the machine to be capable of high-speed production and good-quality work.

A characteristic feature of the machine is the provision of a rotary tool mounted in a carriage arranged to travel around the work (that is, a shoe or the like) in a path which is partially or completely of oval form, or an approximation thereto; that is to say, the tool may circulate continuously around the work in an endless oval path or it may travel to-and-fro around the work in a path which is a partial oval.

Another object of the invention is to provide the machine with means whereby it can be readily adjusted as regards the travel of the carriage to correspond with the length of the sole.

Another object of the invention is to provide a machine as aforesaid which also will be capable of adaptation to various other uses in the manufacture of shoes and the like.

Another object of the invention is to provide a double-ended machine capable of working on shoes and the like fed in single succession but directed alternately to opposite ends of the machine.

Other objects of the invention will be apparent from the following specification and claims.

A machine embodying the invention will now be described, by way of example, with reference to the accompanying drawings, in which:

Fig. 1 is a front view, partly in elevation and partly in cross section, the machine being viewed in one of two opposite directions in which the work, namely shoes and the like, is fed in.

Fig. 3 is a part plan, part horizontal section, of the machine, certain attachments on top thereof being omitted for clearness.

Fig. 4 is a detail view in plan of the travelling carriage, associated driving means and associated guiding means.

Fig. 5 is a detail view, in section on the line V—V of Fig. 3 and to a large scale, of the guide means for the travelling carriage.

Figure 1:
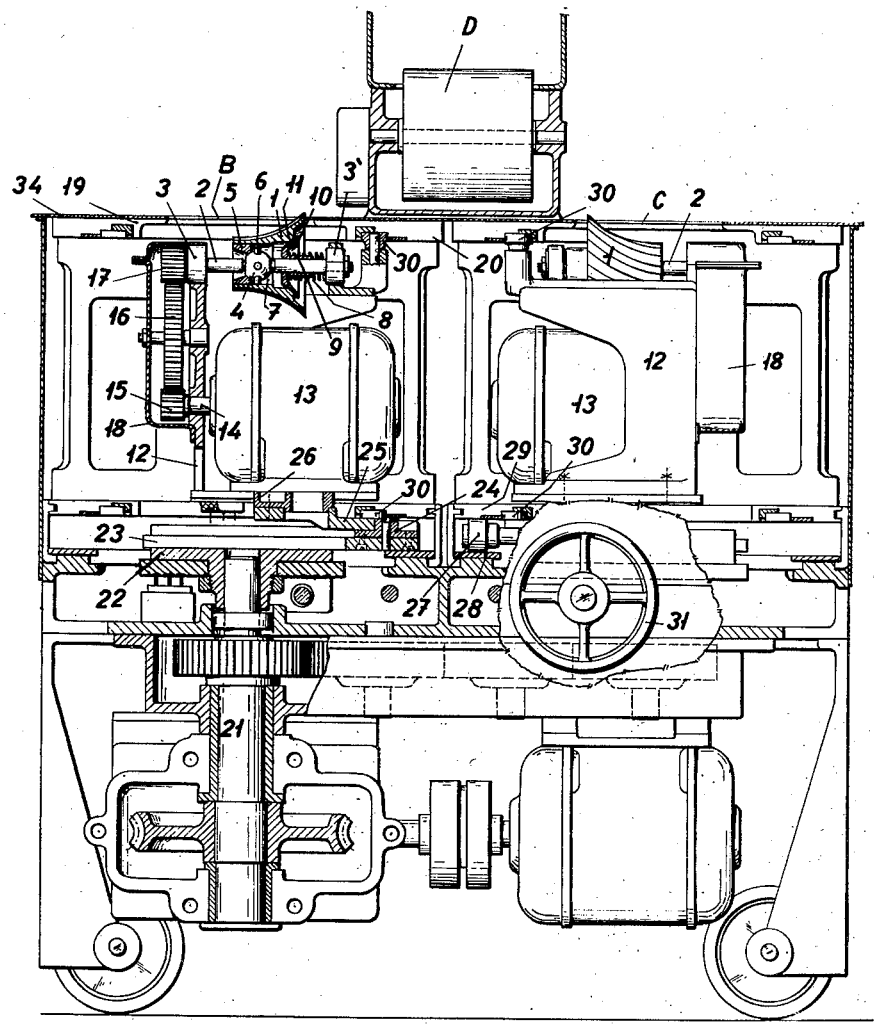

The rolling-in tool or appliance 1 has the form of a hyperboloid of rotation and has an operative connection with a spherical fitting 4 provided on, so as to rotate with, a shaft 2 which is journalled in ball-bearings 3, 3'. This operative connection is obtained as follows: The bore of the tool is formed with a spherical interior accommodating the spherical fitting 4, the tool being retained on the fitting by a nut 5, which is screwed into the interior of the tool 1. The nut 5 is spherically hollowed out counterpart to the fitting 4 so that, in its screwed-in position within the interior of the tool 1, the nut closely fits the tool. The fitting 4 is provided with projecting pins 6 which are secured fast in the fitting and extend like feathers into longitudinal grooves 7 formed in the interior of the tool. The arrangement is such that, in the rotation of the shaft 2, the tool 1 rotates in unison with it, but is free to perform also a universal angular displacement, or tilting on the shaft 2. The axial and angular displacement of the tool 1 on the shaft 2 is yieldingly resisted, and return displacement is effected, by a compression spring 8, which is disposed on a tubular extension 9 of a frusto-conical supporting collar 10 slidably mounted on the shaft 2. The tool 1 is formed with a rearwardly facing internal annular rib 11, and the rounded face or edge of this rib is pressed against by the conical surface of the collar 10. Displacement of the tool 1 either downwards or towards one or other side, under the action of the profile of the work will cause the slidable collar 10 to be pressed by the rounded face 11 in the rearward direction. Accordingly, the spring 8 is compressed, but as soon as the pressure of the sole on the tool 1 ceases, the spring forces the collar 10 and the tool 1 therewith to return to their normal position.

The bearings 3, 3' of the shaft 2 are mounted in a support 12 which, as will be described hereinafter in greater detail, is arranged on a carriage to travel within the frame of the machine and around the work. On this carriage there is also mounted an electromotor 13 whose shaft 14 drives the shaft 2 through the intermediary of toothed gear wheels 15, 16, and it is by this means that the rotational movement of the tool 1 is effected (see Fig. 1). The transmission gearing 15, 16 is enclosed by a cover 18.

The travel of the support 12, which takes place throughout the operation of the machine, is performed along a path which is defined approximately in accordance with the form of the sole being worked upon, said path moreover being variable dimensionally in accordance with the size of the sole.

Figure 2:
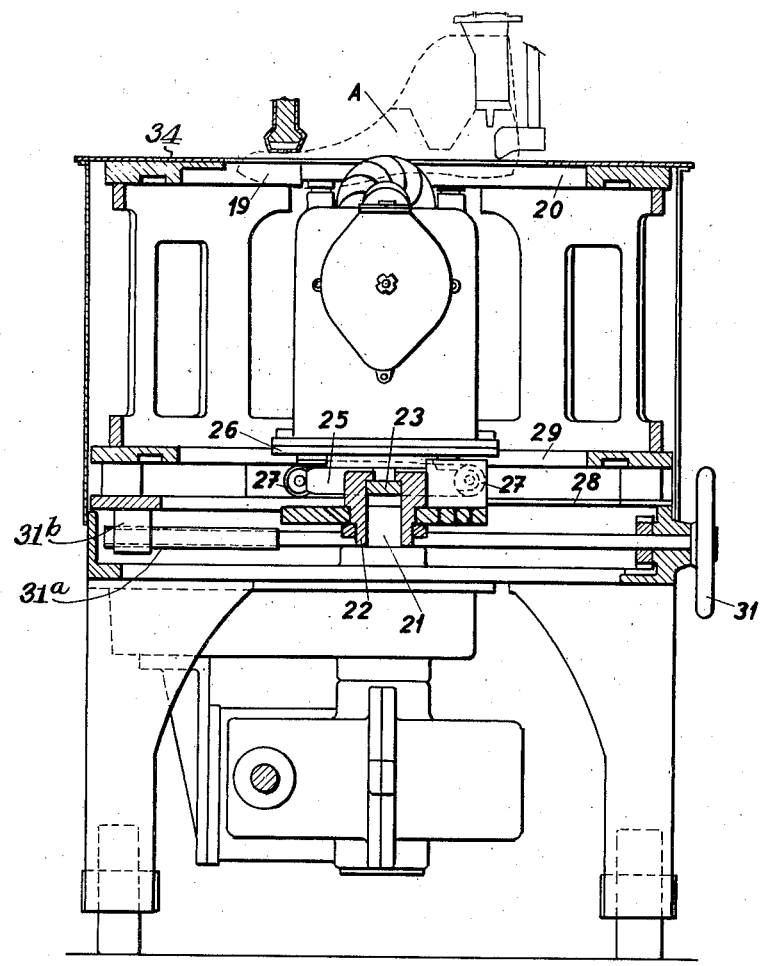
Fig. 2 is a side view, partly in elevation and partly in longitudinal section, of the machine.

For the guidance of the support (and the carriage which carries it) there is provided an oval track including upper rail plates 19 and 20 (Figs. 1, 2 and 3). The travel is performed by the main shaft 21 of the machine through the intermediary of a slotted driver 22 (see Fig. 4) which rotates with the shaft 21 and forces to rotate with it a bar 23 which is freely slidable lengthwise in the slot of the driver 22, the slot acting as a guideway. This bar, at the end thereof remote from the driver 22, is securely fastened in a recess formed in a turnable disc 24. The disc 24 is mounted in the frame of the aforesaid travelling carriage, denoted by 25, and is partially turnable therein under the constraint of the bar 23. The carriage 25 carries a supporting plate 26 to which the support 12 is secured by screws. The carriage 25 has two running wheels 27 which ride under close constraint between pairs of guide plates 28, 29 which form parts of the same structures as the rail plates 19 and 20, respectively. There is so little play or tolerance between the plates 28, 29 and the wheels 27 perpendicular to the axes thereof that the carriage 25 maintains the support 12 firmly in its vertical setting. Moreover, there are provided on the support 12 and the carriage 25, respectively, pairs of small rollers 30, which are horizontally arranged and which during the travel of the carriage as effected by the bar 23, are respectively guided by grooves in the upper rail plates 19, 20 and the lower rail plates 29 (see Fig. 1). The lower pair of these rollers 30 is shown in Fig. 4.

The oval rail track around which the carriage 25 travels is variable in length by virtue of its being constituted by the two relatively adjustable structures, including the rail plates 19 and 20 (see Fig. 3) of which the part 19 is adjustable towards and away from the part 20. Adjustment of the part 19 in relation to the part 20 is effected by means of a hand-wheel 31 whose shaft has a screwed portion 31a engaged in a nut 31b secured to the same adjustable structure as the rail plate 19. By rotating the hand-wheel 31, the track length can be varied in accordance with the length of the sole being worked upon.

In order that the movement of the rollers 30 around their oval rail tracks is not disturbed in any position of adjustment thereof, tenonlike guide members 32, 33 are provided (see Figs. 1, 3 and 5) on the adjustable rail structure including the part 19, said members also serving to guide the rollers 30. These guide members extend from the adjustable structure into mortiselike guide openings in the co-operating stationary structure including the part 20, in which guide openings the members 32, 33 slide during adjustment of the rail track, so that throughout the entire range of adjustment, the grooves in which the rollers 30 run present no interruptions.

Whenever the rollers 30 pass around one of the semi-circular portions of the oval track, they constrain the carriage 25, and the support 12 thereon to follow the same path of movement, so that therefore the entire carriage assembly, including the tool 1 turn through 180° on each occasion that said assembly travels around a semi-circular end of the track. Thus, practically uniform working of the tool on the work around the entire periphery thereof, and also around portions of the surface thereof, is ensured.

The location or fixation of the work on the machine is effected as follows, namely: the work A (see Fig. 2) is gripped and stretched, for example by a pneumatic device for the purpose, the supply and regulation of the compressed air to which is effected by means known per se, including for example a bellcrank lever.

In the drawings, the machine shown is double ended, that is, the machine comprises two shoe-locating positions (at B and C respectively Fig. 1) in association with which there are provided two rolling-in mechanisms, which are mounted on the same machine frame, but at opposite ends thereof. Shoes and the like are fed in succession to the machine but are directed alternately to the opposite ends thereof for working upon by the respective mechanisms. In the foregoing description, only a single mechanism has been described, but the other mechanism is an identical counterpart.

With the object of obtaining better work, the soles are damped before they are located in the machine, for example, by means of a rotating drum D (Fig. 1) which is sprayed with water, the dampening means being disposed above the main frame of the machine and between the two shoe-locating positions.

The working parts of the machine are almost entirely covered on top by a cover plate 34, the provision of which helps to safeguard against accidents and also against the entry of water and dirt to the machine interior.

Electric current can be led to the travelling motor 13 if desired at the underside of the support 12 from a slipring arrangement or a trolley conductor taking its supply from the electric means.

The machine described can be used for purposes additional to that of turning in the channel by rolling in the soles. For example, the machine can be used also as a beating or pounding-up machine adapted to act upon the leather uppers. For this purpose, the rotating tool 1 is axially tilted at an angle to the axis of the carriage 25, with the object of pulling the upper leather in the direction toward the middle and beating it. For this purpose, the tool 1 can be cut out of the rough in various forms; for example, it can be formed advantageously on its surface with lands and grooves of helical formation, the alternation of which lands and grooves in the rotation of the appliance produce the required beating action. In use of this beating device, with the axially tilted tool, a freely turnable ring is fitted on that end of the tool which is presented towards the middle, such a ring being of a greater diameter than the end of the tool, the result of which is that the tool does not come into contact with the burnished sole but simply acts on desired strip of the periphery of the shoe, namely the nipped edge of the upper portion.

Moreover, in the machine as set up to perform a beating operation such as already described, the sole-dampening device D can be replaced by a device for rubbing done the nipped toe portions of the shoes. Such a device would be located between the two work-locating positions and would consist of a rotary disc on which could be fitted a polishing or smoothing attachment, the location of the rubbing device being such that for the polishing or smoothing operation said device would register with the outer edge of the toe. The rubbing-down device in the machine under consideration comprises a polishing plate arranged on a segment which, under the action of a double armed lever in a segmental track, moves in the direction to nip or act upon the base portion of the toe.

The circuitous oval path around which the tool I travels may vary from the form described with reference to the drawings, and could be such that the tool did not pass completely around the heel but turned back on reaching the limits of the heel portion, so that the appliance would travel to-and-fro along a path having approximately the form of an elongated horse shoe. The tool would however be turned about (i. e. so as to face in the opposite direction) when passing around the semi-circular end, or each semi-circular end. The arrangement would depend simply on the manner in which the drive of the bar 23 was arranged to function.

The work to be done upon the peripheral portion of a particular shoe base could be controlled in other ways, for example, by providing a suitably shaped and timed cam, which would stop at a determinate time in the cycle of operations the supply of the compressed air which is utilised for the location of work or by providing other mechanism to effect the required stoppage.

The rolling-in mechanism hereinbefore described could be utilised for various other operations on the base portion of a shoe by suitably arranging the tool correspondingly to the purpose concerned.

I claim:

1. A machine for manufacturing shoes and like work including a sole having a stitches-receiving channel, said machine comprising a location for the work, a carriage, a shaft rotatably mounted on said carriage, a tool mounted on said shaft to rotate therewith, said tool being a roller with a hyperbolic surface, means on said carriage for rotating said shaft, guide means constraining said carriage to a path around said location, and means for driving said carriage around said path so that the carriage carries the hyperbolic tool surface in rolling engagement with the periphery of the sole to close said channel.

2. A machine for manufacturing shoes and like work, said machine comprising a location for the work, a carriage, a tool rotatably and tiltably mounted on said carriage, said tool being a roller with a hyperbolic surface, means yieldingly resisting tilting of said tool, means on said carriage for rotating said tool, guide means constraining said carriage to a path around said location, and means for driving said carriage around said path so that the carriage carries the hyperbolic surface of the tool in yieldingly rolling engagement with the periphery of the work.

3. A machine for manufacturing shoes and like work, said machine comprising a location for the work, a carriage, a shaft rotatably mounted on said carriage, a tool, means supporting said tool on said shaft, means on said carriage for rotating said shaft, guide means constraining said carriage to a path around said location, and means for driving said carriage around said path so that the carriage carries the tool in peripheral engagement with the work, said tool-supporting means comprising a support element on the shaft presenting a spherical surface, a retaining element inside the tool presenting a counterpart spherical surface, said surfaces being interengageable to provide for universal tilting of the tool on the shaft by the action of the work, projections on said support element constraining the tool to rotate with the support element and the shaft and means yieldingly resisting tilting of the tool.

4. A machine for manufacturing shoes and like work including a sole having a stitches-receiving channel, said machine comprising a location for the work, a carriage, a shaft rotatably mounted on said carriage, a hyperbolic rollerlike tool mounted on said shaft, supporting means interposed between said shaft and said tool to constrain the tool to rotate with the shaft but to permit tilting of the tool in relation to the shaft, means yieldingly opposing movement of the tool in relation to the shaft, means on said carriage for rotating said shaft, guide means constraining said carriage to a path around said location, and means for driving said carriage around said path so that the carriage carries the hyperbolic tool surface in rolling engagement with the periphery of the sole to close said channel.

5. A machine as claimed in claim 4, comprising also an abutment which is axially slidable on the aforesaid shaft, and an annular face formed within the rollerlike tool, said abutment being acted upon by the aforesaid movement-opposing means to maintain said abutment in engagement with said face and to return the tool to its normal setting whenever moved therefrom.

6. A machine for manufacturing shoes and like work, said machine comprising a location for the work, a carriage, a support on said carriage, a tool rotatably and tiltably mounted on said support, said tool being a roller, means yieldingly opposing tilting of said tool, means on said carriage for rotating said tool, an oval guide structure arranged around said carriage and the support thereon, rollers on said carriage and support constraining them to travel around said location, and means for driving said carriage around said structure so that the carriage carries the tool in yieldingly rolling engagement with the periphery of the work.

7. A machine for manufacturing shoes and like work including a sole, said machine comprising a location for the work, a carriage, a tool rotatably mounted on said carriage, means on said carriage for rotating said tool, guide means constraining said carriage to a path around said location, said guide means being so formed that said path is substantially oval and approximates to the peripheral form of the sole, supporting wheels on said carriage, rails on which said wheels run, means for driving said carriage around said path so that the carriage carries the tool in engagement with the work, said driving means comprising a driver, means for rotating said driver, and a driving bar interconnecting the driver and carriage.

8. A machine as claimed in claim 7 in which the rotatable driver has a guideway and in which a pivot member is mounted in the aforesaid carriage, the aforesaid driving bar being attached to said pivot member and being slidable along but constrained to rotate by said guideway.

9. A machine for manufacturing shoes and like work, including a sole, said machine comprising a location for the work, a carriage, a tool rotatably mounted on said carriage, means on said carriage for rotating said tool, guide means constraining said carriage to a path around said location, said guide means being composed of structures each including a curved portion, means for effecting relative adjustment between said structures so as to vary the length of said path in accordance with the length of the sole, and means for driving said carriage around said path so that the carriage carries the tool in engagement with the work.

10. A machine as claimed in claim 9, in which the aforesaid guide means include guide tracks and in which the aforesaid structures are interconnected by guide devices constituting continuous joints between adjacent ends of said guide tracks.

11. A machine as claimed in claim 9, in which the aforesaid structures include guide tracks and are provided with structure-jointing guide tenons and counterpart mortises, each tenon on one of said structures sliding freely into the corresponding mortise in the other structure and said tenons constituting continuations of said guide tracks.

12. A machine for manufacturing shoes and like work including a sole having a stitches-receiving channel, said machine comprising a location for the work, a carriage, a tool rotatably mounted on said carriage, said tool having a hyperbolic surface, means on said carriage for rotating said shaft, guide means constraining said carriage to a path around said location, and means for driving said carriage around said path so that the carriage carries the hyperbolic tool surface in rolling engagement with the periphery of the sole to close said channel while the work is in said location.

13. A machine for manufacturing shoes and like work, said machine comprising a location for the work, a carriage, a shaft rotatably mounted on said carriage, a tool, means supporting said tool on said shaft, an electric motor on said carriage, transmission means on said carriage gearing said motor to said shaft, guide means constraining said carriage to a path around said location, means for driving said carriage around said path so that the carriage carries the tool in peripheral engagement with the work, and sliding parts in electrical interconnection one of which is connectible to electric mains and the other of which is connected to the motor to supply electricity thereto.

14. A machine as claimed in claim 1, comprising a frame in which the carriage and parts thereon work, and a cover plate on said frame to shield the working parts.

15. A machine for manufacturing shoes and like work, said machine comprising a single frame structure, two spaced locations on said frame structure for the work, two sets of mechanism, one set being associated with each of the two locations and said sets being adapted to start their work alternately on the work supplied to said locations, each of said sets of mechanism comprising work-gripping means at the respective location, a carriage, a tool rotatably mounted on said carriage, means on said carriage for rotating said tool, guide means constraining said carriage to a path around the respective location, and means for driving said carriage around said path so that the carriage carries the tool in peripheral engagement with the work at the respective location.

16. A machine for manufacturing shoes and like work, said machine comprising a location for the work, a carriage, a support on said carriage, a tool mounted on said support so as to be rotatable and so as to be displaceable by the work, means for rotating said tool, means yieldingly resisting displacement of said tool, a guide structure arranged around said carriage and formed with guiding grooves extending in a substantially oval form approximating to the peripheral form of the work, rollers on said carriage and support adapted to travel in said grooves and constrain the carriage and support to the path defined by said grooves, and means for driving said carriage around said structure so that the carriage carries the tool in peripheral engagement with the work.

JOHN HOZA.